Aug. 22, 1961 J. A. KOZEL ET AL 2,997,062
MIXING VALVE FOR WASHING MACHINES
Filed April 18, 1958 2 Sheets-Sheet 1

INVENTORS
James A. Kozel
Charles E. Lyall
BY H. F. Johnston
ATTORNEY

Aug. 22, 1961  J. A. KOZEL ET AL  2,997,062
MIXING VALVE FOR WASHING MACHINES
Filed April 18, 1958  2 Sheets-Sheet 2

INVENTORS
James A. Kozel
Charles E. Lyall
BY
H. F. Johnston
ATTORNEY

2,997,062
MIXING VALVE FOR WASHING MACHINES

James A. Kozel, Mount Prospect, and Charles E. Lyall, Northbrook, Ill., assignors to Scovill Manufacturing Company, Waterbury, Conn., a corporation of Connecticut Filed Apr. 18, 1958, Ser. No. 729,418
3 Claims. (Cl. 137—606)

My invention is an improved variable automatic mixing valve primarily intended for automatic washing machines for home use.

Two types of mixing valves employed in automatic washers now on the market are commonly referred to as the thermostatic valve and the non-thermostatic valve. From the standpoint of simplicity and cost the non-thermostatic type is preferable, but valves of this type can supply to the machine only water which is all hot, water which is all cold, or an unvariable mixture of the two. The temperature of the mixture will depend on the temperatures and relative pressures at the hot and cold supply connections, and these may vary from house to house or from time to time in the same house. Thus the results produced by the non-thermostatic valve are not always satisfactory.

The thermostatic mixing valves overcome to some extent the disadvantages of the non-thermostatic valves because the thermostat, within limits will compensate for variations in temperatures and pressures at the hot and cold supply connections, and deliver water at some fairly uniform temperature depending on the pre-setting of the thermostat. In most such valves now in use the only other temperature obtainable is that of the hot supply itself. Thus in one position of a control knob, pure hot water may be obtained for washing and under the control of a timer the mixture, as determined by the thermostat, will be supplied for the rinsing cycle. In the other position of the control knob, the same mixture controlled by the thermostat is supplied for both the washing and rinsing cycles.

Important disadvantages of the thermostatic mixing valves are the higher initial cost of manufacture, and the unreliability in performance over a long period of time. Furthermore, while it has been proposed to make such thermostats adjustable so that the user could vary the temperature of the mixed water to suit different conditions and needs, this has generally not been done in practice because of the still further complications and expense.

In general, the purpose of my invention is to provide an improved automatic mixing valve which will, in effect, combine the advantages of present valves of both the non-thermostatic type and the thermostatic type, and further to enable the user quickly and easily to obtain unlimited variations of the temperature of the water being delivered, over the entire range between the temperatures of the hot and cold water supplies.

My improved mixing valve involves the use of two solenoid controlled diaphragm valves, which for convenience are sometimes referred to simply as solenoid valves. The first such valve controls the flow, to an outlet passage in the valve body, of water whose temperature is dependent on the setting of a proportioning or metering valve which may be manually adjusted by the user to any one of an infinite number of positions. The second solenoid valve controls the admission of cold water only from a by-pass passage directly to the outlet passage in the valve body.

Thus in practice, the user will decide the temperature of the wash water most suitable for the fabrics being laundered and set the metering valve in a position to obtain that temperature and the exact position will vary depending on the temperatures and relative pressures of the hot and cold supply in any particular installation. A temperature indicating device may be conveniently arranged to show the temperature of the water in the outlet so that this adjustment can produce precisely the temperature desired. Thereafter, the flow of water for the washing cycle is automatically controlled by the timer and the first solenoid valve.

While this ability to control the temperature accurately during the washing cycle is an important result of my invention, it is known that such accurate control is not needed for the rinse water. Nevertheless, my improved valve may provide, by appropriate switches controlling the solenoid valves, rinse water which is (a) the same as the wash water; (b) the same as the cold water inlet temperature; or (c) a mixture of the preceding (a) and (b). The latter is more often desired and this is obtained by holding open the second solenoid valve along with the first solenoid valve. It will be noted that any possibility of the rinse water ever being hotter than the wash water setting is eliminated and this is an improvement over any device that relies on mechanical connections to produce the rinse water setting.

A further object of my invention is to provide a unitary construction that will perform all the above functions, which is very compact, and wherein the hot and cold water inlets are in closely spaced parallel relation on one side of the valve body and the solenoid valves project from the opposite side of the valve body preferably in line with the inlets. For convenience in description these two sides of the valve body will be referred to as the bottom and top sides respectively.

Other objects in combination with the above arrangement, are to locate the metering valve in a cavity in the valve body adjacent the hot water inlet and the diaphragm of the first solenoid valve, to provide a rotatable control shaft for the proportioning valve extending from the front face or side of the valve body, and a front plate or cap which serves both to close the mixing chamber at the front and to support and retain the metering valve and control shaft.

Other objects and advantages will hereinafter more fully appear.

In the accompanying drawings, I have shown for purposes of illustration the embodiment of my invention which at present is regarded as preferable. In these drawings.

Figure 1:
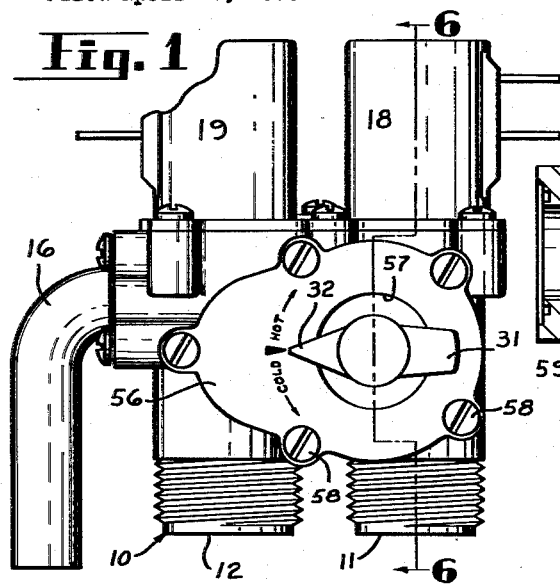
FIG. 1 is a front elevation of a variable automatic mixing valve embodying my invention.
Figure 4:
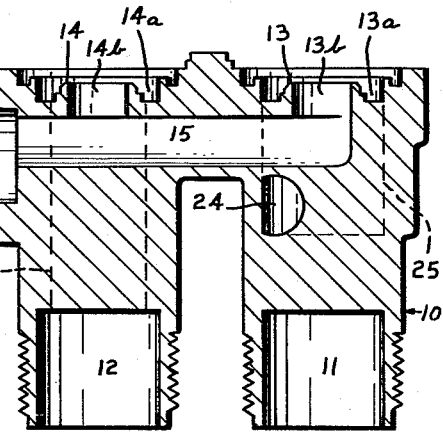
FIG. 4 is a sectional view of the valve body taken along the line 4—4 of FIG. 2.
Figure 2:
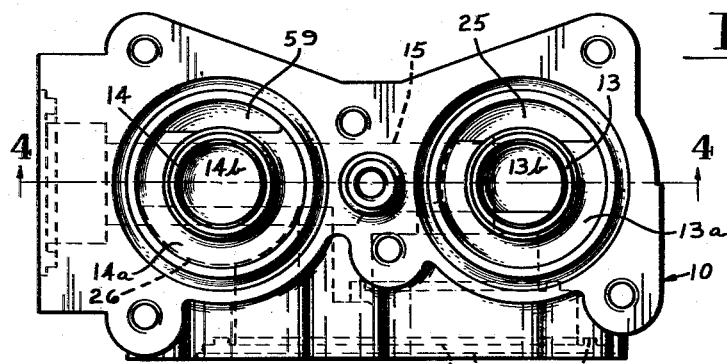
FIG. 2 is a top plan view of the valve body per se.

Referring now to the drawings wherein I have shown a mixing valve comprising a valve body 10 having hot and cold water inlets 11 and 12 respectively on the bottom side of the body in closely spaced parallel relation. At the opposite side or top of the body are the solenoid controlled diaphragm valves 18 and 19 cooperating with the valve seats 13 and 14 in axial alignment with the hot and cold water inlets 11 and 12 respectively. The first solenoid valve 18 controls communication between the mixed water chamber 13a surrounding the valve seat 13 and the port 13b leading directly to the outlet passage 15 that extends horizontally through the valve body to open through one end of the body 10 into an outlet connection 16 suitably joined to that end of the body. Similarly, the second solenoid valve 19 controls communication between a cold water chamber 14a surrounding the valve seat 14 and the port passage 14b leading directly to the outlet passage 15, as best seen in FIG. 4.

Figure 6:
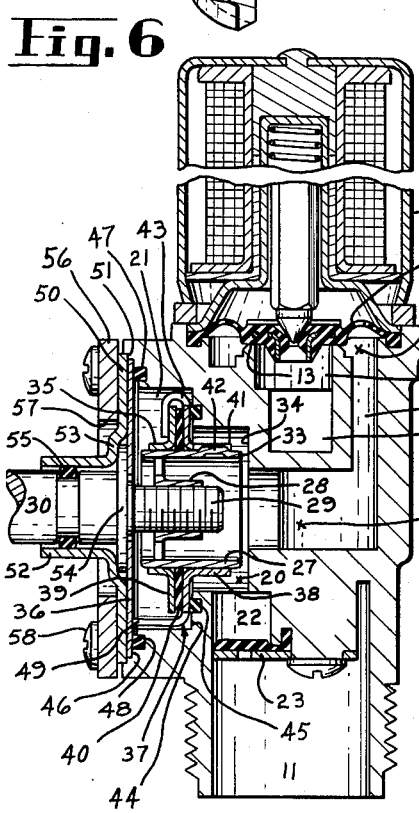
FIG. 6 is a sectional view of the valve unit taken along the line 6—6 of FIG. 1.
Figure 7:
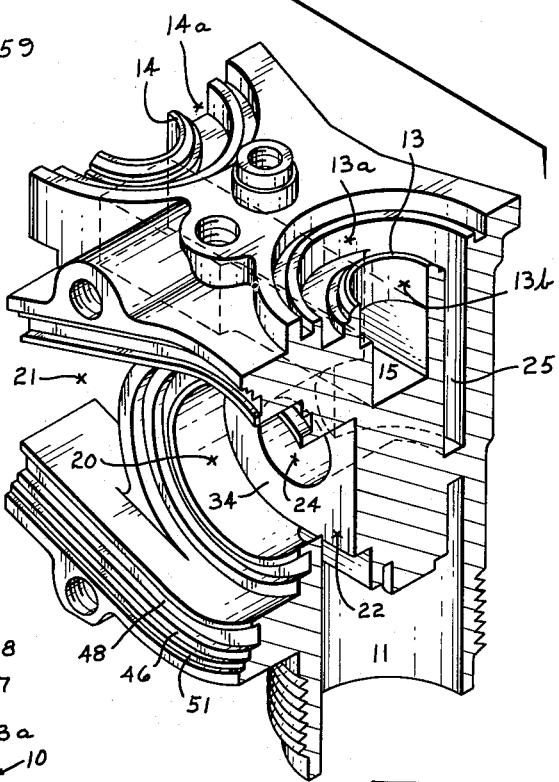
FIG. 7 is a perspective view of the metering or proportioning valve with the supporting and guide means for the same.
Figure 7:
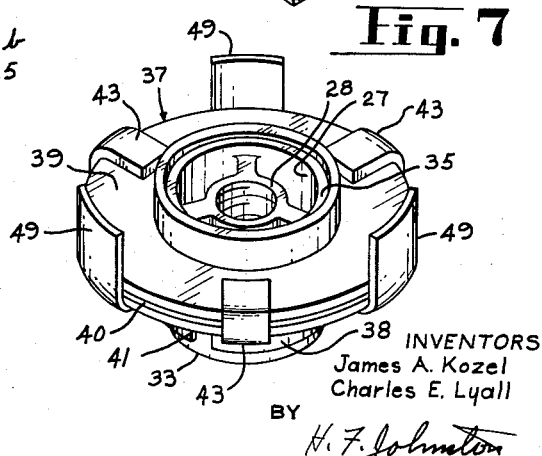

The two solenoid valves are alike and the one numbered 18 is shown in section in FIG. 6. Since the detailed construction and operation of these valves as well as the manner of attaching them to the valve body are well known and understood in the art, no detailed description is necessary here. The particular flexible diaphragm 17 shown in FIG. 6 is shown in closed position seated against the valve seat 13.

Figure 3:
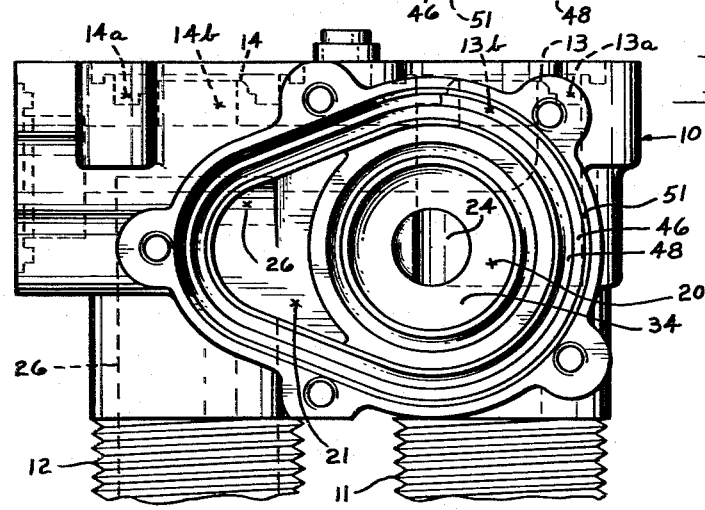
FIG. 3 is a front elevation of the same.
Figure 5:
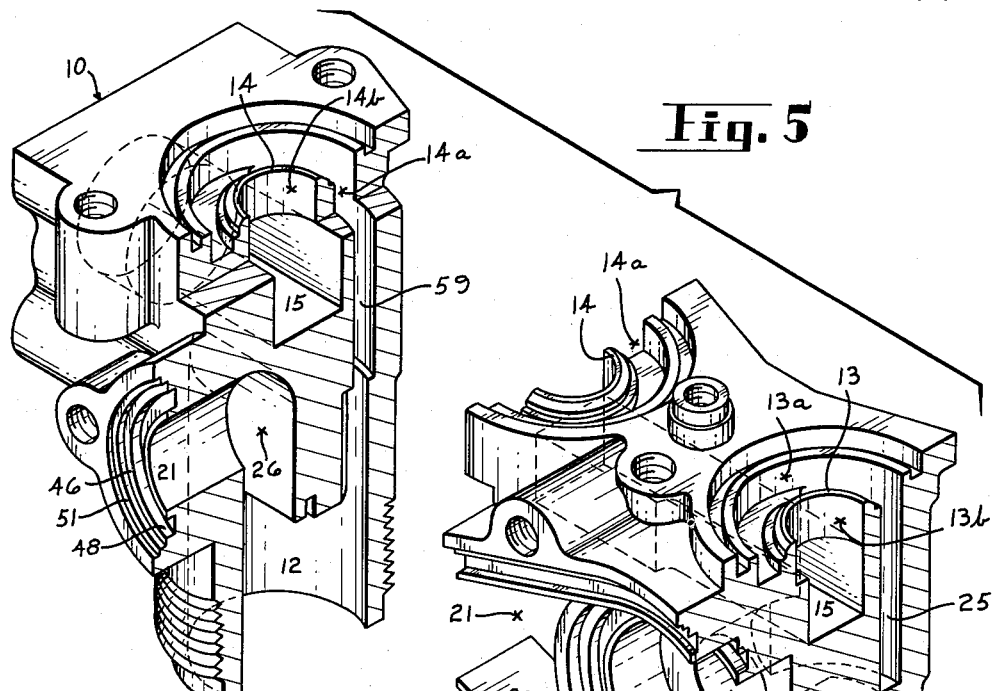
FIG. 5 is an exploded sectionalized isometric drawing of the valve body, per se.

The manner in which the mixed water is supplied to the solenoid valve 18 will now be described. It will be seen in FIGS. 5 and 6 that there is a cylindrical chamber 20 of rather large diameter in the valve body which is on a horizontal axis and opens toward the front to a still larger cold water chamber 21 of pear-shape when looking at the front face of the valve body as in FIG. 3. The chamber 20, which for convenience, will be called the mixing chamber (although the actual mixing occurs in the central portion of the inner end of this chamber) is located close to the hot water inlet 11 and also close to the annular chamber 13a around the valve seat 13. Hot water flows to the mixing chamber 20 through a short passage 22 and preferably a suitable check valve 23 is mounted in this passage to prevent any possible backflow of water into the hot water inlet from the mixing chamber. Water flows from the mixing chamber through the short horizontal passage 24 and vertical passage 25 to the annular mixed water chamber 13a, and (when the solenoid valve 18 is open) through the port 13b into the outlet passage 15. Cold water is supplied to the pear-shaped chamber 21 by an angular passage 26 which first leads upwardly from the inlet 12 then forwardly to the chamber 21. A check valve (not shown) may also be installed in this cold water supply passage.

The proportioning or metering valve is in the form of a hollow cylindrical sleeve 27 having on its interior an apertured spider 28 which is internally threaded to receive the reduced threaded end 29 of a control shaft 30. The control shaft extends through the front of the washing machine housing and carries on its end a suitable handle or knob 31 with indicating means 32. The inner end 33 of the sleeve valve moves toward and away from the flat bottom wall 34 of the hot water chamber 20 to regulate the flow of hot water and the other end 35 of the sleeve valve moves toward and away from the valve plate 36 to regulate the flow of cold water from the pear-shaped chamber 21 into the interior of the sleeve valve. The cold water thus mixes with the hot water and flows out through the horizontal passage 24 and vertical passage 25 to the solenoid valve 18. If the sleeve valve 27 is seated against the wall 34 of the chamber 20 only cold water will be admitted and if the other end of the valve is seated against the plate 36, only hot water will be admitted. At any selected intermediate position, a mixture of any desired temperature between that of the hot and cold water may be obtained.

The sleeve valve 27 moves in a surrounding cage, generally designated 37, which also serves as a partition between the cold water chamber 21 and the hot water chamber 20. The cage consists of an inner piece 38 and an outer piece 39 having comparatively wide circumferential flanges between which is clamped a sealing ring 40 which is in fluid-tight engagement with the sleeve valve 27. The skirt portion of the inner piece 38 has a slot 41 into which is slidably fitted a projection 42 on the sleeve valve to prevent rotation of the valve. The inner and outer pieces of the cage 37 and the gasket 40 are held together by tongues 43, herein three in number, which extend from the edge of the flange on the inner piece and are bent around the flange on the outer piece of the cage.

The flange on the inner piece 38 rests against the shoulder 44 between the hot water chamber 20 and the larger cold water chamber 21 and a suitable gasket 45 is placed in a groove in the shoulder so as to prevent leakage of water between the cold water chamber 21 and hot water chamber 20. The valve plate 36 fits in a recess 46 around the pear-shaped cold water chamber and a gasket 47 is fitted in a groove 48 to prevent leakage of water around the cold water chamber. The cage 37 has a plurality of lugs 49, herein three in number, which also extend from the flange of the inner piece of the cage 37 around the edge of the flanges, and outwardly into engagement with the valve plate 36 so that when said valve plate is clamped in position, the cage 37 is automatically held in place with the fingers 43 and lugs 49 fitting against the outer wall of the cold water chamber so as to center the cage with respect to the hot water chamber 20.

A bearing plate 50 fits into a recess 51 in the valve body 10 around the pear-shaped chamber 21 and carries a cylindrical hub 52 and between the hub 52 and the bearing plate 50 is a shoulder 53 so as to provide a space to snugly receive a flange or collar 54 on the control shaft 30. A seal is also provided between the control shaft 30 and the hub 52 which may be in the form of a rubber O ring 55. A cover plate 56 having an aperture 57 to accommodate the control shaft, the hub 52 and the shoulder 53 is placed against the bearing plate 50 and held in place on the valve body by suitable screws 58. It will thus be seen that entire assembly of the valve, valve cage, valve plate and control shaft are held in place by the cover plate 56 which permits easy assembly and disassembly. Since the control shaft is held against axial movement by the collar 54, the valve 27 may be easily moved to any desired position by turning the control knob 31.

Cold water may be admitted directly to the outlet passage 15 for the rinsing cycle. For this purpose, a by-pass passage 59 leads upwardly around the outside of the outlet passage 15 directly to the annular valve chamber 14a and when the solenoid valve 19 is opened, cold water will flow through the port 14b directly to the outlet.

The manner of operation of my improved variable automatic mixing valve will now be readily understood. The user will select by movement of the control knob 31 a mixture of hot and cold water to give the precise temperature desired for washing any particular type of fabric. The timer will automatically control the flow of this predetermined mixture for the washing cycle and then will cause the solenoid valve 19 to admit cold water to the mixture for the rinsing cycle, or, if desired, the solenoid valve 18 can be closed admitting only cold water for the rinsing cycle. The compact arrangement, with the solenoid valves aligned with the hot and cold water inlets, and with the mixing chamber formed in the valve body almost directly between the hot inlet and the mixed water solenoid valve, permits of easy installation in a standard automatic washer. A simple manual adjustment will enable the user to obtain an infinite variation of water temperatures for the washing cycle while at the same time, the control of the washing and rinsing cycles is automatic.

I claim:

1. A variable mixing valve for automatic washing machines comprising a unitary valve body having hot and cold water inlets, an outlet connection, an outlet passage in the valve body leading to said outlet connection, means defining hot and cold water chambers closely adjacent each other within said valve body communicating with said hot and cold water inlets respectively, a mixed water chamber in said valve body, a unitary valve movable in said hot and cold water chambers to proportion the flow of water from said hot and cold water chambers to said mixed water chamber, manual control means for said unitary valve projecting to the exterior of said valve body, a solenoid valve for establishing or cutting off communication between said mixed water chamber and said outlet passage, a supplemental cold water chamber communicating with the cold water inlet through a by-pass passage in the valve body, a second solenoid valve for establishing or cutting off communication between said supplemental cold water chamber and said outlet passage, wherein said hot and cold water inlets project from the underside of the valve in closely spaced parallel relationship and wherein said solenoid valves are located on the top side of the valve body substantially in alignment with said inlets and wherein said manual control means includes a shaft projecting from the front face of said valve body, means forming a partition between the hot and cold water chambers comprising a cage surrounding said sleeve in sealing relation with a shoulder between said hot and cold water chambers, said cage including inner and outer pieces with parallel annular flanges, and a gasket between said flanges in sealing relation with said sleeve, each of said pieces having a cylindrical skirt embracing said sleeve.

2. A variable mixing valve according to claim 1 wherein said hollow sleeve has fixed to the interior thereof an internally threaded spider, said spider being apertured to permit flow of water axially through the sleeve and wherein said control member comprises a rotatably mounted shaft having its inner end threaded into said spider, means for forming a cover for both of said cold water chambers including a hub through which said shaft projects, and a collar on the shaft cooperating with said cover means to prevent endwise movement of the shaft whereby rotary movement of said shaft will impart axial movement to said sleeve.

3. A variable mixing valve according to claim 2 wherein said cage is provided with lugs extending into contact with said covering means whereby the latter will hold said cage in place.

References Cited in the file of this patent
UNITED STATES PATENTS

| | | |
|---|---|---|
| 773,541 | Bunting | Nov. 1, 1904 |
| 1,628,069 | Schmidt | May 10, 1927 |
| 2,620,134 | Obermaier | Dec. 2, 1952 |
| 2,830,765 | Beller | Apr. 15, 1958 |
| 2,843,150 | Goodwin | July 15, 1958 |

UNITED STATES PATENT OFFICE
CERTIFICATE OF CORRECTION

Patent No. 2,997,062                      August 22, 1961

James A. Kozel et al.

It is hereby certified that error appears in the above numbered patent requiring correction and that the said Letters Patent should read as corrected below.

Column 1, lines 10 and 58, for "My", each occurrence, read -- Our --; same column 1, line 50, column 2, lines 11, 12, 25, 46 and 50, and column 4, line 45, for "my", each occurrence, read -- our --; column 2, lines 45 and 62, for "I", each occurrence, read -- we --; column 4, line 65, for "I" read -- We --.

Signed and sealed this 2nd day of January 1962.

(SEAL)
Attest:

ERNEST W. SWIDER
Attesting Officer

DAVID L. LADD
Commissioner of Patents